United States Patent [19]

Ishikawa

[11] Patent Number: 4,991,101
[45] Date of Patent: Feb. 5, 1991

[54] DATA COMMUNICATION CONTROL SYSTEM

[75] Inventor: Masataka Ishikawa, Higashimatsuyama, Japan

[73] Assignee: Diesel Kiki Co., Ltd., Tokyo, Japan

[21] Appl. No.: 501,422

[22] Filed: Mar. 28, 1990

Related U.S. Application Data

[63] Continuation of Ser. No. 195,120, May 17, 1988, abandoned.

[30] Foreign Application Priority Data

Jun. 19, 1987 [JP] Japan .................................. 62-152880

[51] Int. Cl.⁵ ........................ F02D 41/30; G06F 15/20
[52] U.S. Cl. .......................... 364/431.05; 364/431.04; 123/480; 123/487
[58] Field of Search ..................... 364/431.12, 431.11, 364/431.04, 431.05, 200, 900; 123/479, 480, 487

[56] References Cited

U.S. PATENT DOCUMENTS

| | | | |
|---|---|---|---|
| 4,556,955 | 12/1985 | Wright et al. | 364/431.06 |
| 4,677,558 | 6/1987 | Böhmler et al. | 364/431.12 |
| 4,730,256 | 3/1988 | Niimi et al. | 364/431.12 |
| 4,791,569 | 12/1988 | Suzuki | 364/431.11 |
| 4,797,828 | 1/1989 | Suzuki et al. | 364/431.11 |

FOREIGN PATENT DOCUMENTS

| | | |
|---|---|---|
| 3433778 | 3/1986 | Fed. Rep. of Germany ................. 364/431.04 |
| 61-1832 | 1/1986 | Japan . |
| 61-286541 | 12/1986 | Japan . |

*Primary Examiner*—Parshotam S. Lall
*Assistant Examiner*—V. N. Trans
*Attorney, Agent, or Firm*—Frishauf, Holtz, Goodman & Woodward

[57] ABSTRACT

A data communication control system includes first and second control units each having a microcomputer, the second control unit carrying out a first interrupt processing which starts in accordance with a first timing signal having a first period, and a second interrupt processing which starts in accordance with a second timing signal having a second period, the second interrupt processing being for the second control unit to receive data transferred from the first control unit. The second timing signal is generated in the first control unit in such a manner that adjacent ones of the second timing signal have values of the second period different from each other. Therefore, even if the first interrupt processing and the second interrupt processing conincide with each other the coincidence is not continued whereby transfer of data can be reliably carried out.

8 Claims, 6 Drawing Sheets

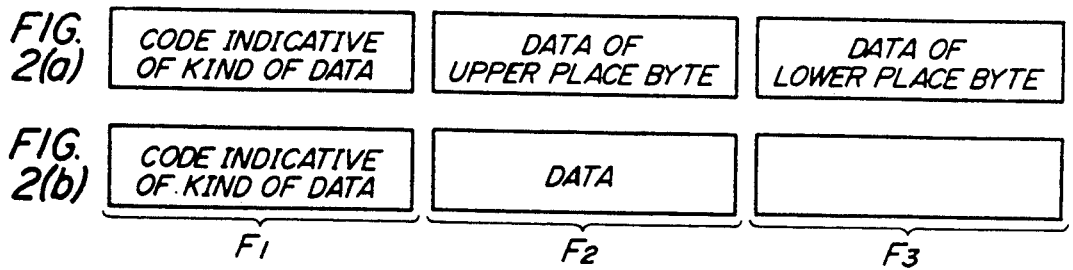
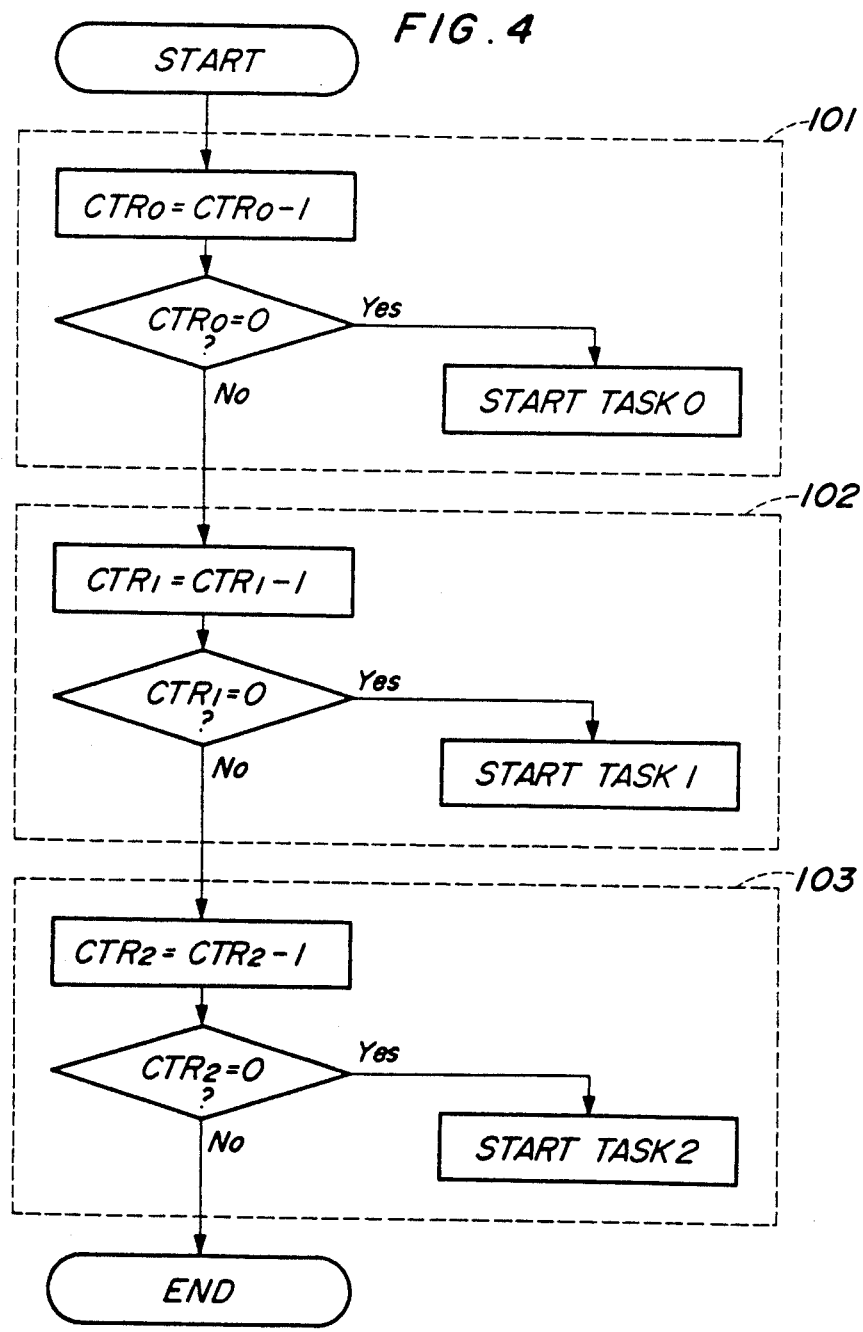

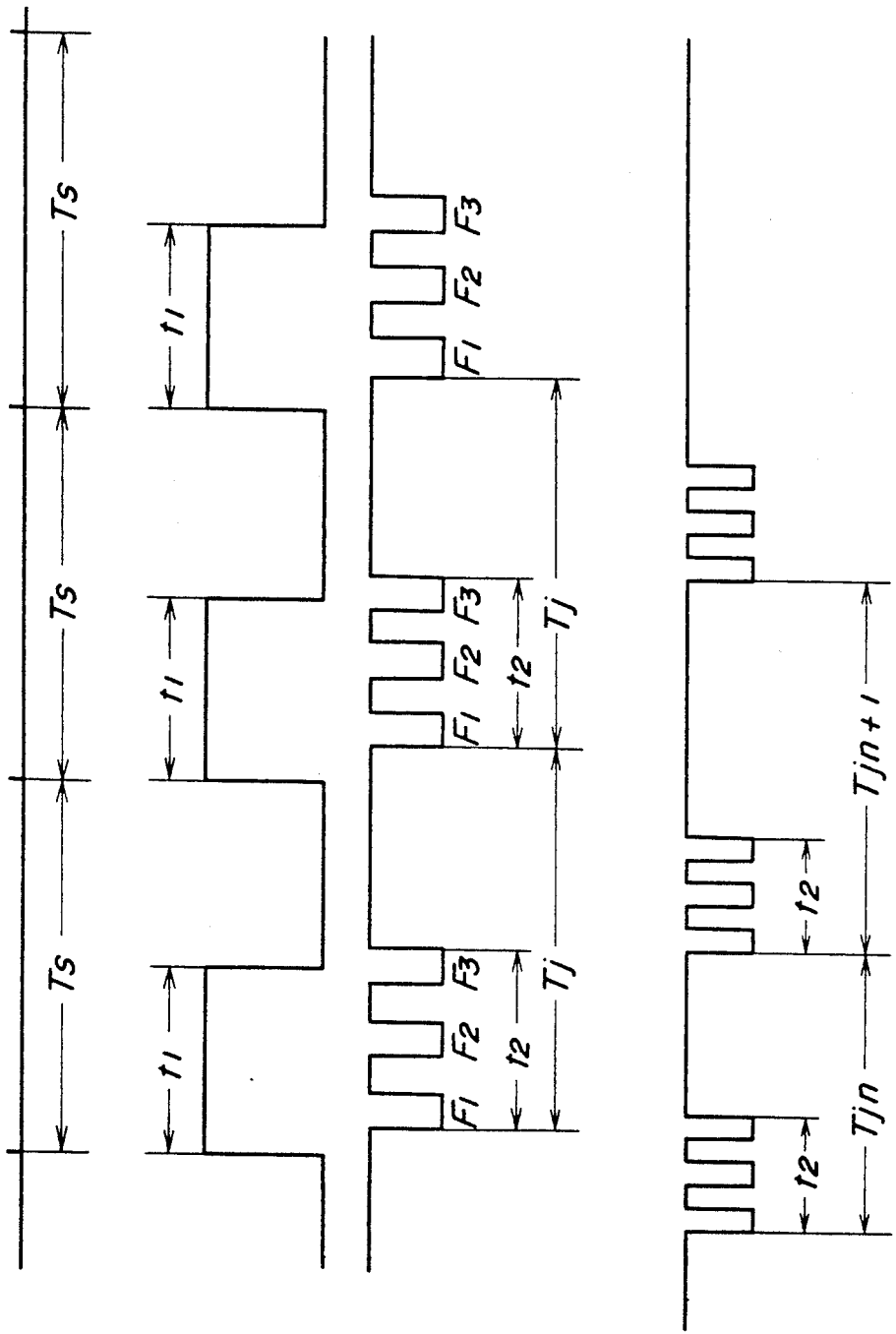

FIG. 5
FIG. 7
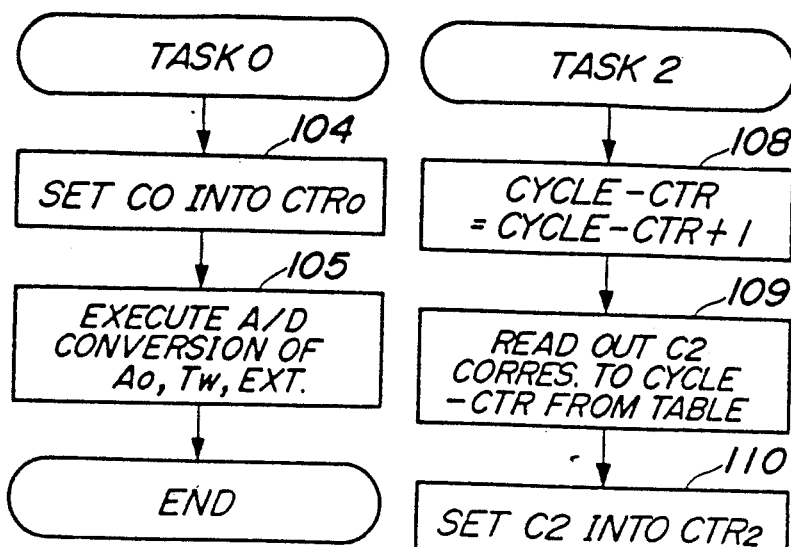
FIG. 6
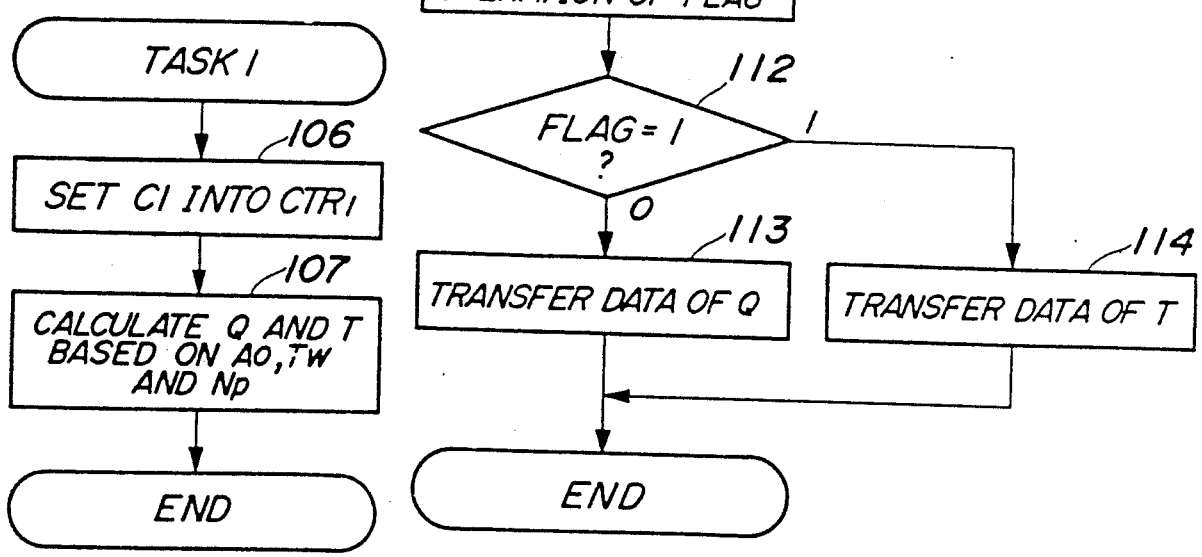
FIG. 9
| CYCLE-CTR | 0 | 1 | 2 | 3 | ..... | n-1 | n |
|---|---|---|---|---|---|---|---|
| C2 | p | q | p | q | ..... | p | q |

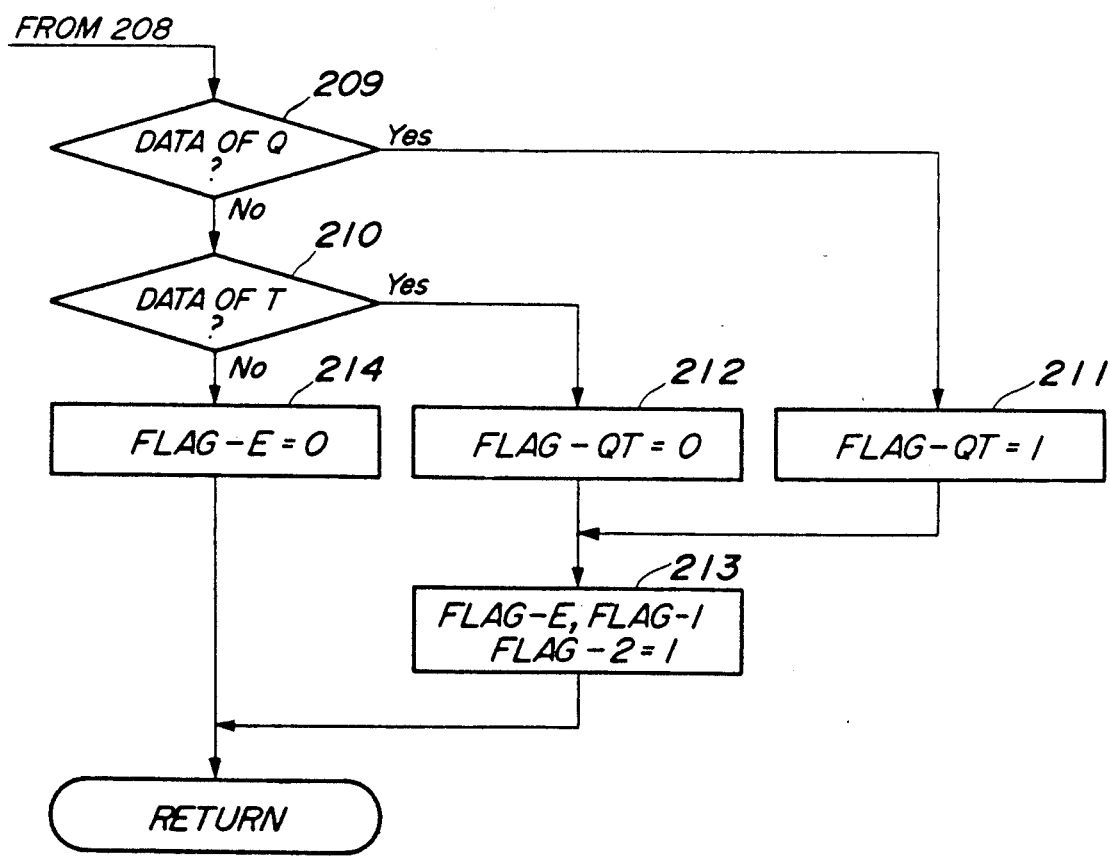

DATA COMMUNICATION CONTROL SYSTEM

This application is a continuation of application Ser. No. 07/195,120 filed May 17, 1988 now abandoned.

BACKGROUND OF THE INVENTION

This invention relates to a data communication control system in which transfer of data is carried out between two control units each of which has a microcomputer, and more particularly to a data communication control system of an electronic fuel injection control apparatus of an internal combustion engine, particularly a diesel engine, in which transfer of data is carried out between two control units.

Conventionally, a system for controlling the fuel injection of a diesel engine, in which transfer of data is carried out between first and second control units each having a microcomputer, has been disclosed, for example, in Japanese Provisional Patent Publication (Kokai) No. 61-1832. This system is so constructed that the first control unit is provided outside a fuel injection pump and the second control unit is provided inside the fuel injection pump, and data of a desired fuel injection quantity and data of a desired fuel injection timing calculated in the first control unit are transferred to the second control unit by interrupt processing, and the second control unit on one hand receives both the data and on the other hand is interrupted by pulses generated in accordance with the rotation of a camshaft of the fuel injection pump whereby the second control unit calculates driving timing of a solenoid valve which effects opening and closing of a fuel injection valve, by the use of the data of the desired fuel injection quantity and the data of the desired fuel injection timing, and data of a rotational speed and a rotational angular position of the camshaft of the fuel injection pump which are detected based on the above-mentioned pulses, and sends out a signal based on results of the calculation for driving the solenoid valve.

However, according to such a construction of the conventional system, no consideration has been given to the relationship between the period of transfer of data from the first control unit to the second control unit and the period of interruption of the second control unit by pulses generated in accordance with the rotation of the camshaft of the fuel injection pump. Therefore, if the period of transfer of data and the period of interruption by the pulses continuously coincide with each other, and if the interrupt processing for reception of the data and the interrupt processing responsive to the pulses, both of which are to be carried out in the second controll unit, coincide with each other, the time will not come when the interrupt processing for reception of the data is carried out.

SUMMARY OF THE INVENTION

An object of the invention is to provide a data communication control system in which transfer of data between two control units each having a microcomputer is carried out in a reliable manner and without fail.

According to the present invention, there is provided a data communication control system including a first control unit having a microcomputer and a second control unit having a microcomputer, the second control unit carrying Out a first interrupt processing which starts in accordance with a first timing signal having a first period, and a second interrupt processing which starts in accordance with a second timing signal having a second period, the second interrupt processing being for the second control unit to receive data transferred from the first control unit. The data communication control sYstem is characterized by an improvement wherein the second timing signal is generated in the first control unit in a manner such that adjacent ones of the second timing signal have values of the second period different from each other.

The above and other objects, features and advantages of the invention will become more apparent upon reading of the following detailed description taken in conjunction with the accompanying drawings.

BRIEF DESCRIPTION OF THE DRAWINGS

FIGS. 2(a) and 2(b) are schematic diagrams showing examples of formats of communication data;

FIGS. 3(a) to 3(d) depict a timing chart showing the relationship between interrupt processing for reception of communication data and interrupt processing executed with a period based on the rotation of a fuel injection pump;

FIG. 4 is a flow chart showing routines Tasks 0, 1, and 2 to be executed, based on monitoring which is carried out with a constant period in a first control unit;

FIG. 5 is a flowchart showing the steps of Task 0 shown in FIG. 4;

FIG. 6 is a flowchart showing the steps of Task 1 shown in FIG. 4;

FIG. 7 is a flowchart showing the steps of Task 2 shown in FIG. 4;

FIGS. 8(A) and 8(B) depict a flowchart showing the steps of interrupt processing for reception of data carried out in a second control unit; and FIG. 9 is a table for determining the period of execution of the steps of Task 2 shown in FIG. 7.

DETAILED DESCRIPTION

An embodiment of the present invention will now be described in detail with reference to the drawings.

Figure 1:
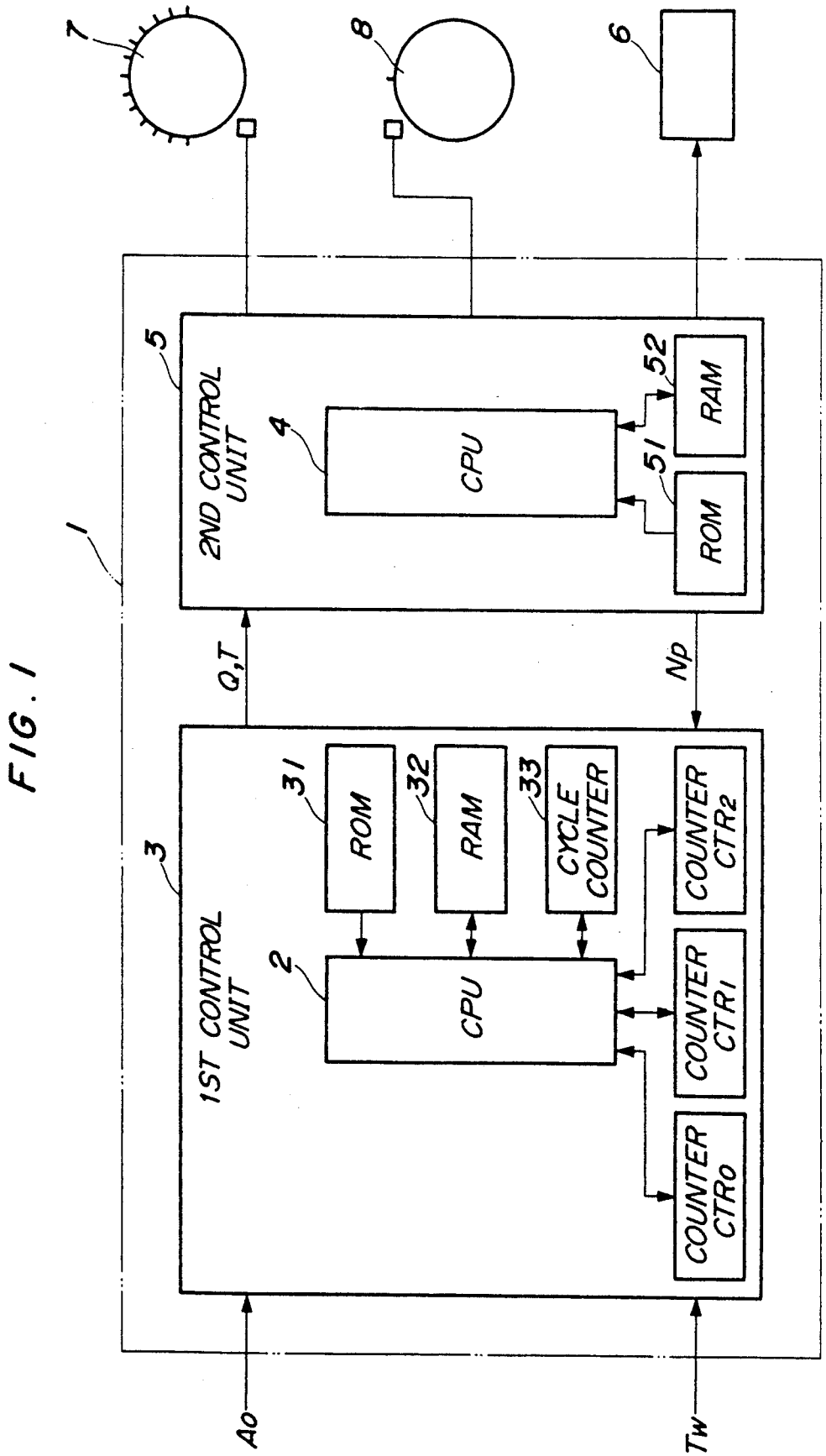
FIG. 1 is a block diagram showing the construction of a fuel injection control apparatus to which the present invention is applied.

As shown in FIG. 1, a fuel injection control apparatus 1 for a fuel injectiOn pump driven by a diesel engine, not shown, is provided with a first control unit 3 having a first microcomputer including a CPU 2, a ROM 31, and a RAM 32, a cycle counter 33, and counters CTR0, CTR1, and CTR2, and a second control unit 5 having a second microcomputer including a CPU 4, a ROM 51, and a RAM 52. The first control unit 3 is supplied with a signal indicative of accelerator opening (accelerator pedal position) Ao, i.e. the amount of operation of an accelerator of the engine and a signal indicative of engine coolant temperature Tw, wherein the signals are converted into digital signals. The first control unit 3 also receives from the second control unit 5 data of rotational speed Np of a camshaft of the fuel injection pump. On the basis of these inputted data, the first control unit 3 calculates a desired fuel injection quantity Q and a desired fuel injection timing T of fuel to be supplied to the engine, and sends results of calculation to the second control unit 5. On the other hand, the second control unit 5 carries out control of opening and closing of a solenoid valve 6 in a manner described hereinbelow on the basis of the data received from the first control unit 3, including the desired fuel injection quantity Q and the desired fuel injection timing T. The transfer of data between the first control unit 3 and the second control unit 5 is carried out by means of serial transfer.

The second control unit 5 is supplied, by interrupt processing, with an output from a mark pulse sensor ? which generates 36 mark pulses per one rotation of the camshaft of the fuel injection pump, and an output from a reference pulse sensor 8 which generates one reference pulse per one rotation of the camshaft. The CPU 4 of the second control unit 5 calculates the rotational speed Np from the frequency of generation of the mark pulses, and rotational angular position (at intervals of ten degrees) of the camshaft of the fuel injection pump from both the pulses. Further, based upon the desired fuel injection quantity Q and desired fuel injection timing T transferred from the first control unit 3 the second control unit 5 calculates driving signals for the solenoid valve 6 with reference to the rotational speed Np and rotational angular position of the camshaft. In response to the driving signals the solenoid valve 6 opens or closes to thereby control the quantity of fuel supplied to the engine and the timing of injection of the fuel. Such a fuel injection device is known from Japanese Provisional Patent Publication (Kokai) No. 61-286541.

FIGS. 2(a) and 2(b) shows two examples of formats of data serially transferred between the control units 3 and 5. FIG. 2(a) shows a 3-frame type in which a first frame FI contains a code indicating the kind of data contained in a second frame F2 and a third frame F3, e.g. the desired fuel injection quantity Q and the desired fuel injection timing T, the second frame F2 contains a higher place byte of data to be transferred, and the third frame F3 contains a lower place byte of the data. FIG. 2(b) shows a 2-frame type having a smaller amount of data to be transferred at a time in which a first frame F1 contains a code indicating the kind of data contained in a second frame F2, and the second frame F2 contains the whole byte of data to be transferred. In an embodiment described hereinafter, the desired fuel injection quantity Q and the desired fuel injection timing T are transferred by the use of the format shown in (a) of FIG. 2(a).

FIGS. 3(a) to 3(d) the relationship between interrupt processing of data serially transferred from the first control unit 3 to the second control unit 5 and interrupt processing based on mark pulses inputted to the second control unit 5. FIG. 3(a) shows the timing of generation of the mark pulses having a pulse repetition period Ts which varies in accordance with the rotational speed Np. FIG. 3(b) shows a period of time t1 during which interrupt processing by the second control unit 5 is executed based on the mark pulses. The interrupt processing is carried out during the high level period of time t1, which is read out in accordance with the period Ts from a map stored in ROM 51 in the second control unit 5. FIG. 3(c) shows a period of time t2 during which the data serially transferred from the first control unit is received by the second control unit 5 through interrupt processing. During the low level periods of time corresponding to the frames F1, F2, and F3 FIG. 3(c), interrupt processing is carried out. The period of time t2 is a constant value determined by the setting of the format shown in FIG. 2(a). A period Tj shown in FIG. 3(c) is a period of time between commencement time points of adjacent periods of time t2. The data in the format shown in FIG. 2(a) is sent from the first control unit 3 at constant intervals of the predetermined period Tj set by the first control unit 3. However, if the periods Ts and Tj continually coincide with each other, the period of time ti for interrupt processing based on the mark pulses and the period of time t2 for interrupt processing for reception of the data will continually coincide with each other.

If the periods of time tl and t2 thus coincide with each other, the interrupt processing for reception of the data, which is the lower in priority, is not carried out. Therefore, if interrupt based on the mark pulses and interrupt for reception of data coincide with each other when the periods of time Ts and Tj coincide with each other and the engine is rotating at a constant speed, the data is continually not received by the second control unit whereby the control by the second control unit based on new data is made impossible to execute.

Therefore, in the system according to the present invention, as shown in FIG. 3 (d), the values of the period Tj at which data is sent from the first control unit 3 are made different between adjacent transfers of the data. Specifically, adjacent periods $Tj_n$ and $Tj_{n+1}$ are made different from each other. If the period of transfer of the data is set in this manner, coincidence of the period of time t1 with the period of time t2 is not continued. Therefore, even if the period of time t! coincides with the period of time t2 one time so that it is impossible to effect the transfer of the data, this is not continued and reception of the data by the second control unit is reliably carried out the next time.

FIG. 4 shows a routine which is carried out in the first control unit 3 and starts in accordance with a monitoring program with a constant period. In order to start tasks TASK0, TASKl, and TASK2 which are controlled by the monitoring program, the down counters CTR0, CTR1, and CTR2 which are under the control of respective tasks and in which respective predetermined values C0, C1, and C2 are set as initial values are started, and when each of the counted values becomes 0, a corresponding task is started (steps 101-103). With respect to TASK0 and TASKl, the predetermined values C0 and C1 are constant, and therefore the periods of execution of the tasks are constant. TASK0 is a program for A/D conversion of parameters, e.g. accelerator opening and engine coolant temperature inputted to the first control unit 3, TASK1 is a program for calculation of a desired fuel injection quantity Q and desired fuel injection timing T, and TASK2 is a program for sending the data of Q and T to the second control unit 5.

As shown in FIGS. 5 and 6, in TASK0 and TASK1, the predetermined values C0 and C1 are set into the respective counters CTR0 and CTR1 (steps 104 and 106) for determining the start timing of the A/D conversion and the calculation of Q and T to be executed next time Then the A/D conversion and the calculation of Q and T are carried out (steps 105 and 107).

FIG. 7 shows the steps of TASK2, in which the predetermined value C2, which is related to the period $Tj_n$ for sending the data, is selected from a table (FIG. 9) stored in ROM 31 in the first control unit 3 in accordance with a value CYCLE-CTR which is indicated by a cycle counter and increased by 1 each time a step 108 is carried out and returns to 0 when a predetermined value is reached (steps 108 and 109). Specifically, the table contains at least two different values p and q as the predetermined value C2 which correspond to different cycle counter values CYCLE-CTR, and the predetermined value C2 is selected in accordance with the value CYCLE-CTR indicated by the cycle counter. The selected predetermined value C2 is set into the counter CTR2 as an initial value (step 110), and the set initial value is used at a step 103 when the program shown in FIG. 4 is carried out again. Thereafter, transfer of each of the data of the desired fuel injection quantitY and the data of the desired fuel injection timing is alternately carried out in accordance with steps 123 and 112 each time TASK2 of FIG. 7 is executed. Therefore, since the predetermined value C2 used when TASK2 is carried out in the immediately preceding loop is different from the predetermined value C2 used when TASK2 is carried out in the present loop, the values of adjacent periods $Tj_n$ and $Tj_{n+1}$ are different from each other, as shown in (d) of FIG. 3.

Figure 8A:
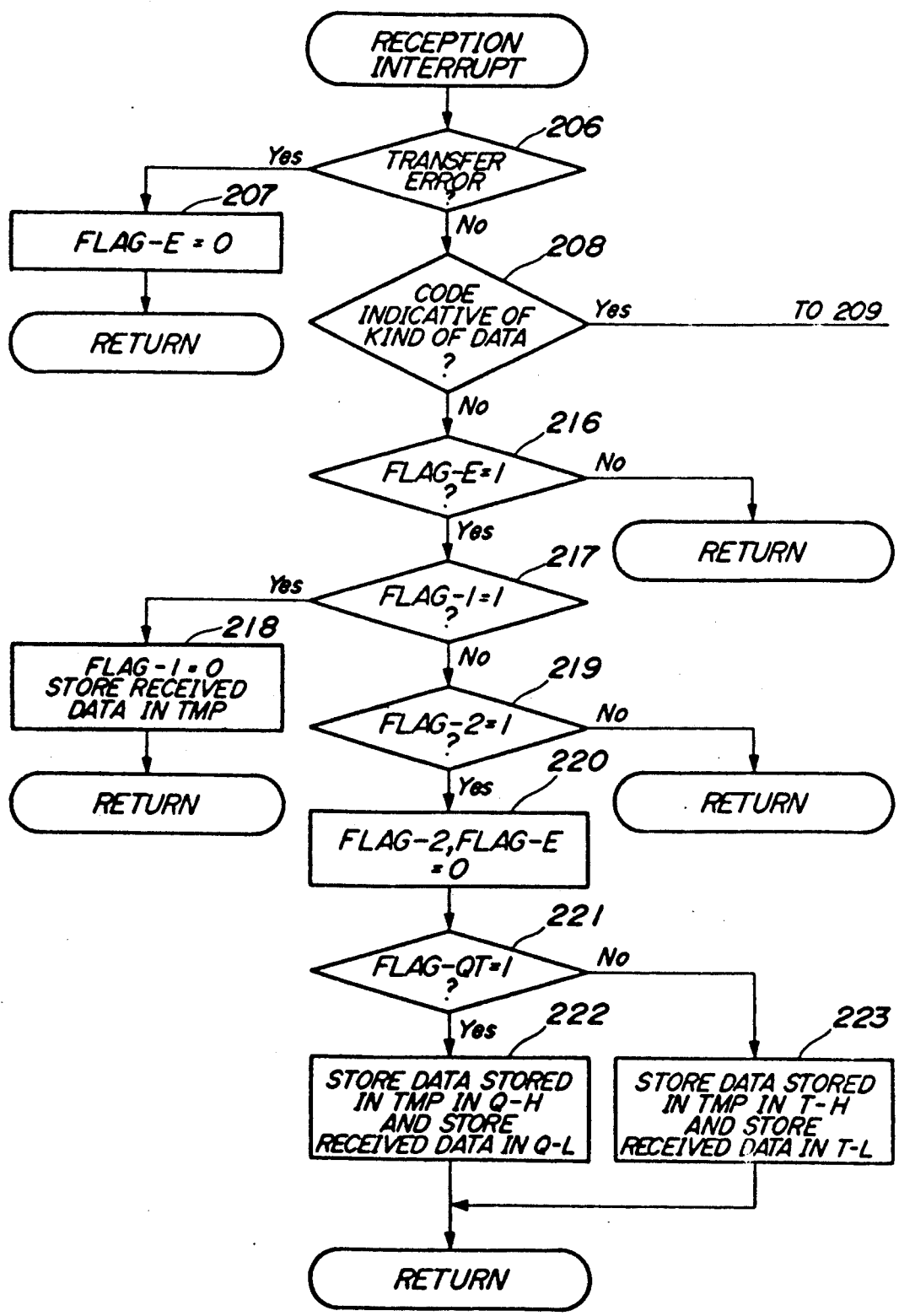

FIGS. 8(A) and 8(B) show an interrupt routine carried out in the second control unit 5 for receiving the data sent from the first control unit 3. At a step 206, it is determined, for example, by the technique of parity check, whether a received signal is due to a transfer error or not. In the case of a transfer error, a transfer error flag (FLAG-E) is cleared (i.e. reset to zero) to thereby terminate the present routine. If it is determined at the step 206 that no transfer error exists, it is determined whether the signal received this time is a code indicating a kind of data or not (step 208). If it is determined that the received signal is a code indicating a kind of data, it is determined whether the code indicates Q (desired fuel injection quantity) Or not (step 209) and whether the code indicates T (desired fuel injection timing) or not (step 210). If the code indicates the data of Q, a flag FLAG-QT is set to 1 (step 212), while if the code indicates the data of T, the flag FLAG-QT is cleared or reset to 0 (step 212). Further, at a step 213, flags FLAG-E, FLAG-1, and FLAG-2 are set to 1 to thereby terminate the present routine.

On the other hand, if it is determined at the step 208 that the signal received this time is not a code indicating a kind of data, in other words, if it is determined that the received signal indicates data contained in the second frame F2 or the third frame F3 shown in FIG. 2(a), it is determined at a step 216 whether the transfer error flag (FLAG-E) is 1 or not. If it is determined that FLAG-E is not 1, in other words, FLAG-E is 0, this indicates that some transfer error has occurred in the immediately preceding loop, so that reception of the data is not carried out.

If it is determined at the step 216 that FLAG-E is 1, it is determined at a step 217 whether the flag FLAG-1 is 1 or not. FLAG-1 indicates whether the higher place byte of the data of Q or of the data of T contained in the second frame F2 shown in (a) of FIG. 2 has been received or not, and is set to 1 at the step 213 after a code indicating a kind of data has been received, as noted before. Therefore, if the reception interrupt started in the present loop is based on a signal (corresponding to the second frame F2 in FIG. 2(a) which comes next to a code indicating the kind of data (corresponding to the first frame F1 in (a) of FIG. 2), the result of determination at the step 217 is affirmative, and the program proceeds to a step 218. At the step 218, the data received this time (the higher place byte of the data of Q or the data of T) is temporarily stored in a register TMP and at the same time FLAG-1 is reset to 0 to thereby terminate the present routine. If it is determined at the step 217 that FLAG-1 is 0, it is determined at a step 219 whether FLAG-2 is 1 or not. FLAG-2 indicates whether the lower place byte of the data of Q or of the data of T contained in the third frame F3 in (a) of FIG. 2 has been received or not. If reception of the data has been normally carried out, the result of determination at the step 219 is affirmative, since FLAG-2 has been set to 1 at the step 213 when a code indicating the data of Q or the data of T has been received, and then the program proceeds to a step 220. At the step 220, FLAG-2 and FLAG-E are cleared, and then the program proceeds to a step 221. If the result of determination at the step 219 is negative, the present routine is terminated. At the step 221, it is determined whether FLAG-QT is 1 or not. In other words, since FLAG-QT has been set to 1 (step 211) if the received data is the data of Q, or has been cleared or set to 0 (step 212) if the received data is the data Of T, it is determined at the step 221 whether the received data is the data of a desired fuel injection quantity Q or that the received data is the data of desired fuel injection timing T. Depending on the state of FLAG-QT, the data of the higher place bYte temporarily stored in the register TMP at the step 218, which may be the data of Q or the data of T, is stored into a higher place byte Q-H of a data register (step 222) when the stored data is the data of Q, or into a higher place byte T-H of the data register (step 223) when the stored data is the data of T, and also the data received in the present loop, which maY be the lower place byte of the data of Q or of the data of T, is stored into a lower place byte Q-L of the data register (step 222) when the received data is the lower place byte of the data of Q, or into a lower place byte T-L of the data register (step 223) when the received data is the lower place byte of the data of T, to thereby terminate the present routine.

As described above, according to the present invention, there is provided a period-setting means which sets the data transfer period $Tj_n$ for sending data from the first control unit 3 to the second control unit 5 in such a manner that a data transfer period of transfer processing at one time is different from a data transfer period of transfer processing at the next time. Therefore, even if the timing of interrupt processing carried out in the second control unit for reception of data from the first control unit coincides with the timing of interrupt processing triggered bY a rotational speed Np signal pulse, the coincidence is not continued, so that transfer of data can be reliably carried out.

What is claimed is:

1. In a data communication control system including a first control unit having microcomputer and a second control unit having a microcomputer, said second control unit including means for carrying out a first interrupt processing which starts in accordance with a first timing signal having a first period, and a second interrupt processing which starts in accordance with a second timing signal having a second period, said second control unit includes means responsive to said second interrupt processing to receive data transferred from said first control unit, wherein said first interrupt processing has priority over said second interrupt processing;

the improvement wherein said first control unit includes means for generating said second timing signal in a manner such that adjacent ones of said second timing signal have values of said second period different from each other, whereby at least one of said adjacent ones of the second timing signal can occur at a time which does not conflict with the first interrupt processing so as to enable the second control unit to carry out the second interrupt processing.

2. A data communication control system as claimed in claim 1, the generating means of said first control unit includes a first counter means, a storage means storing a table having at least two different values which correspond respectively to adjacent count values of said first counter means, and a second counter means for counting a value read from said table stores in said storage means and corresponding to a count value of said first counter means, said second timing signal being generated when said second counter means completes counting said value read from said table.

3. A data communication control system as claimed in claim 2, wherein said first period of said first timing signal is proportional to the rotational speed of a fuel injection pump of an internal combustion engine.

4. A data communication control system as claimed in claim 1, wherein said data transferred from said first control unit and received by said second control unit is data indicative of an injection quantity of fuel to be supplied to an internal combustion engine.

5. A data communication control system as claimed in claim 4, wherein said first interrupt processing is for said second control unit to control a fuel injection pump of said engine on the basis of said data transferred from said first control unit.

6. A data communication control system as claimed in claim 1, wherein said data transferred from said first control unit and received by said second control unit is data indicative of the injection timing of fuel into an internal combustion engine.

7. A data communication control system as claimed in claim 6, wherein said first interrupt processing is for said second control unit to control a fuel injection pump of said engine on the basis of said data transferred from said first control unit.

8. A data communication control system as claimed in claim 1, wherein said first period of said first timing signal is proportional to the rotational speed of a fuel injection pump of an internal combustion engine.

* * * * *